(12) United States Patent
Shimoyama et al.

(10) Patent No.: US 12,480,176 B2
(45) Date of Patent: Nov. 25, 2025

(54) METHOD OF MANUFACTURING GRAIN-ORIENTED ELECTRICAL STEEL SHEET

(71) Applicant: JFE STEEL CORPORATION, Tokyo (JP)

(72) Inventors: Yusuke Shimoyama, Tokyo (JP); Yukihiro Shingaki, Tokyo (JP); Takashi Terashima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 445 days.

(21) Appl. No.: 18/003,339

(22) PCT Filed: Jun. 29, 2021

(86) PCT No.: PCT/JP2021/024639
§ 371 (c)(1),
(2) Date: Dec. 27, 2022

(87) PCT Pub. No.: WO2022/004752
PCT Pub. Date: Jan. 6, 2022

(65) Prior Publication Data
US 2023/0250506 A1     Aug. 10, 2023

(30) Foreign Application Priority Data
Jun. 30, 2020    (JP) .................. 2020-113541

(51) Int. Cl.
*C21D 9/46*     (2006.01)
*C21D 1/42*     (2006.01)
(Continued)

(52) U.S. Cl.
CPC .............. *C21D 9/46* (2013.01); *C21D 1/42* (2013.01); *C21D 3/04* (2013.01); *C21D 6/001* (2013.01);
(Continued)

(58) Field of Classification Search
CPC ... C21D 9/46; C21D 1/42; C21D 3/04; C21D 6/001; C21D 6/002; C21D 6/005;
(Continued)

(56) References Cited

U.S. PATENT DOCUMENTS

| 3,933,024 A | 1/1976 | Matsumoto et al. |
| 5,139,582 A | 8/1992 | Kurosawa et al. |

(Continued)

FOREIGN PATENT DOCUMENTS

| CN | 1127168 A | 7/1996 |
| EP | 3128028 A1 | 2/2017 |

(Continued)

OTHER PUBLICATIONS

David K. Matlock et.al. ["Metallurgy of Induction Hardening of Steel", ASM Handbook, vol. 4C, Induction Heating and Heat Treatment, 2014, p. 45-57] (Year: 2014).*

(Continued)

*Primary Examiner* — Sally A Merkling
*Assistant Examiner* — Nazmun Nahar Shams
(74) *Attorney, Agent, or Firm* — KENJA IP LAW PC

(57) ABSTRACT

Provided is a method of manufacturing a grain-oriented electrical steel sheet with which a grain-oriented electrical steel sheet with excellent magnetic properties and little variation in iron loss in the longitudinal direction of a coil can be stably manufactured. The method includes subjecting a steel slab to hot-rolling and optionally to annealing, then performing cold rolling once or twice or more to obtain a cold-rolled sheet with a final sheet thickness, and then subjecting the cold-rolled sheet to decarburization annealing and then secondary recrystallization annealing, where immediately before final cold rolling, a steel sheet is heated at a heating rate of 100° C./s or more to a heating temperature of 100° C. or higher and 350° C. or lower, and a time (Continued)

from when the steel sheet reaches the heating temperature to when it is bitten in a first pass of final cold rolling is set to within 5 seconds.

6 Claims, 3 Drawing Sheets

(51) Int. Cl.
| | |
|---|---|
| *C21D 3/04* | (2006.01) |
| *C21D 6/00* | (2006.01) |
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/16* | (2006.01) |
| *C22C 38/20* | (2006.01) |
| *C22C 38/22* | (2006.01) |
| *C22C 38/32* | (2006.01) |
| *C22C 38/34* | (2006.01) |
| *C22C 38/60* | (2006.01) |

(52) U.S. Cl.
CPC ............. *C21D 6/002* (2013.01); *C21D 6/005* (2013.01); *C21D 6/008* (2013.01); *C21D 8/1222* (2013.01); *C21D 8/1233* (2013.01); *C21D 8/1261* (2013.01); *C21D 8/1266* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/20* (2013.01); *C22C 38/22* (2013.01); *C22C 38/32* (2013.01); *C22C 38/34* (2013.01); *C22C 38/60* (2013.01); *C21D 2201/05* (2013.01); *C22C 2202/02* (2013.01)

(58) Field of Classification Search
CPC .... C21D 6/008; C21D 8/1222; C21D 8/1233; C21D 8/1261; C21D 8/1266; C21D 8/1272; C21D 8/1283; C21D 2201/05; C21D 8/1227; C21D 8/1244; C22C 38/001; C22C 38/002; C22C 38/008; C22C 38/02; C22C 38/04; C22C 38/06; C22C 38/08; C22C 38/12; C22C 38/16; C22C 38/20; C22C 38/22; C22C 38/32; C22C 38/34; C22C 38/60; C22C 2202/02

USPC .......................................................... 148/111

See application file for complete search history.

(56) References Cited

U.S. PATENT DOCUMENTS

| | | | |
|---|---|---|---|
| 5,666,842 | A | 9/1997 | Komatsubara et al. |
| 2022/0010400 | A1 | 1/2022 | Okubo et al. |

FOREIGN PATENT DOCUMENTS

| | | | | |
|---|---|---|---|---|
| EP | 3517646 | A1 | | 7/2019 |
| JP | S5016610 | A | | 2/1975 |
| JP | H01215925 | A | | 8/1989 |
| JP | H02112818 | A | | 4/1990 |
| JP | H04120216 | A | | 4/1992 |
| JP | H08253816 | A | | 10/1996 |
| JP | H09157745 | A | | 6/1997 |
| JP | H1036914 | A | | 2/1998 |
| JP | 2016089198 | A | | 5/2016 |
| JP | 2018051576 | A | * | 4/2018 |
| JP | 2020056105 | A | | 4/2020 |
| JP | 2020084303 | A | | 6/2020 |
| WO | 2020111006 | A1 | | 6/2020 |

OTHER PUBLICATIONS

Suehiro Ryuichi, et.al. [JP2016089198A] (IDS provided) (machine translation) (Year: 2016).*

Fukushima Suguhiro, et.al. [JP2018051576A] (machine translation) (Year: 2018).*

Sep. 14, 2021, International Search Report issued in the International Patent Application No. PCT/JP2021/024639.

Nov. 16, 2023, the Extended European Search Report issued by the European Patent Office in the corresponding European Patent Application No. 21831589.3.

May 20, 2025, Office Action issued by the Korean Intellectual Property Office in the corresponding Korean Patent Application No. 10-2022-7046307 with English language concise statement of relevance.

* cited by examiner

METHOD OF MANUFACTURING GRAIN-ORIENTED ELECTRICAL STEEL SHEET

TECHNICAL FIELD

This disclosure relates to a method of manufacturing a grain-oriented electrical steel sheet.

BACKGROUND

A grain oriented electrical steel sheet is a soft magnetic material used as an iron core material of transformers and generators, and it is a steel sheet with excellent magnetic properties having a crystalline structure where {110}<001> orientation (Goss orientation), which is an easy magnetization axis of iron, is highly accorded with the rolling direction of the steel sheet.

Examples of methods of increasing the intensity of the Goss orientation include a method described in JP S50-016610 A (PTL 1) where a cold-rolled sheet during cold rolling is subjected to heat treatment at a low temperature and subjected to aging treatment.

JP H08-253816 A (PTL 2) describes a technology of setting the cooling rate during hot-rolled sheet annealing or intermediate annealing before final cold rolling to 30° C./s or more and further performing aging treatment between passes twice or more for 2 minutes or longer at a steel sheet temperature of 150° C. to 300° C. during final cold rolling.

JP H01-215925 A (PTL 3) describes a technology that utilizes dynamic strain aging where dislocations introduced during rolling are immediately fixed with C or N by increasing the steel sheet temperature during rolling and performing warm rolling.

The technologies of PTLS 1 to 3 maintain the steel sheet temperature at an appropriate temperature before cold rolling, during rolling, or between passes of rolling, thereby diffusing carbon (C) and nitrogen (N), which are solute elements, at a low temperature to fix dislocations introduced by cold rolling, so that the movement of the dislocation in subsequent rolling is suppressed and shear deformation is caused to improve a texture obtained by rolling. By applying these technologies, a large number of Goss orientation seed crystals are formed when the steel sheet is a primary recrystallized sheet, and those Goss orientation seed crystal grains develop during secondary recrystallization. As a result, the intensity of the Goss orientation after secondary recrystallization can be increased.

JP H09-157745 A (PTL 4) describes a technology to further enhance the effect of the above-mentioned strain aging, where heat treatment is performed immediately before final cold rolling of a cold rolling process to preliminarily precipitate fine carbides in steel, the final cold rolling is divided into a first half and a second half, rolling is performed at a low temperature of 140° C. or lower with rolling reduction in a range of 30% to 75% in the first half and at a high temperature of 150° C. to 300° C. with at least two reduction passes in the second half, and the total rolling reduction of the first half and the second half is in a range of 80% to 95%, to stably obtain a material in which grains are highly accorded with the Goss orientation.

JP H04-120216 A (PTL 5) describes a technology of performing heat treatment at 50° C. to 150° C. for 30 seconds to 30 minutes under a tension of 0.5 kg/mm$^2$ or more before cold rolling performed by a tandem mill to precipitate fine carbides in steel, and performing aging treatment during cold rolling.

CITATION LIST

Patent Literature

PTL 1: JP S50-016610 A
PTL 2: JP H08-253816 A
PTL 3: JP H01-215925 A
PTL 4: JP H09-157745 A
PTL 5: JP H04-120216 A

SUMMARY

Technical Problem

In recent years, however, the demand for energy conservation is becoming more and more severe, and it is required to develop technologies to further reduce iron loss.

The technologies of performing aging treatment between passes during rolling, such as those described in PTLS 1 to 3, have a problem that rolling with a short distance between passes and a high line speed, such as rolling using a tandem mill, does not produce satisfactory effects.

The technologies of performing heat treatment before cold rolling, such as those described in PTLS 4 and 5, have a problem that the precipitation form of carbide changes due to the temperature difference inside a coil after coiling, which results in large variations in iron loss in the longitudinal direction of the coil.

It could thus be helpful to provide a method of manufacturing a grain-oriented electrical steel sheet with which a grain-oriented electrical steel sheet with excellent magnetic properties and little variation in iron loss in the longitudinal direction of a coil can be stably manufactured.

Solution to Problem

To solve the above problems, we have made extensive studies on the method of performing heat treatment before cold rolling. We found that in processes of manufacturing a grain-oriented electrical steel sheet, it is possible to stably manufacture a grain-oriented electrical steel sheet with improved texture, excellent magnetic properties, and little variation in iron loss in the longitudinal direction of a coil by heating a steel sheet to a heating temperature of 100° C. or higher and 350° C. or lower at a heating rate of 100° C./s or more immediately before final cold rolling and setting the time from when the steel sheet reaches the heating temperature to when it is bitten in the first pass of final cold rolling to within 5 seconds, thereby completing the present disclosure.

The final cold rolling refers to cold rolling after which the thickness of the steel sheet is a final sheet thickness.

"Immediately before final cold rolling" means immediately before the steel sheet is bitten in the first pass of final cold rolling. In a case where cold rolling is performed once, it means immediately before the steel sheet is bitten in the first pass of the cold rolling, and in a case where cold rolling is performed twice or more with intermediate annealing performed therebetween, it means immediately before the steel sheet is bitten in the first pass of the last cold rolling.

The heating temperature of 100° C. or higher and 350° C. or lower means the highest temperature (maximum temperature) reached by the steel sheet in the temperature range.

The method of manufacturing a grain-oriented electrical steel sheet of the present disclosure includes heating a steel sheet to a heating temperature of 100° C. or higher and 350° C. or lower at a heating rate of 100° C./s or more immediately before final cold rolling. This can reduce variations in magnetic properties. Although the reason why the variations in magnetic properties are reduced is not clear, it is presumed as follows.

By heating a steel sheet immediately before final cold rolling, the biting temperature in the first pass of the rolling is increased, and the type of sliding system that is active during the first pass of the rolling process is also increased compared with cases without heating immediately before the rolling. Since the biting temperature in the subsequent passes of the rolling is lower than the biting temperature in the first pass of the rolling due to strip coolant, some of the sliding systems that are active in the first pass of the rolling are inactivated in the subsequent passes due to the lowered processing temperature. Dislocations that are active in these sliding systems cannot move in the subsequent passes of the rolling, which inhibits the movement of dislocations that are caused in the subsequent passes of the rolling and consequently works in the same way as fine carbides that fix the dislocations. As a result, shear deformation is promoted during the rolling, the texture is improved, and the magnetic properties of a final grain-oriented electrical steel sheet are improved. Further, the effect of inhibiting movement due to the interaction between dislocations is stronger than the effect of pinning dislocation by fine carbides. As a result, the influence of morphological change of the carbides in the steel sheet in the longitudinal direction of a coil is reduced.

The method of manufacturing a grain-oriented electrical steel sheet of the present disclosure includes, immediately before final cold rolling, setting the time from when the steel sheet reaches the predetermined heating temperature to when it is bitten in the first pass of the final cold rolling to within 5 seconds. This can suppress the deterioration of magnetic properties. Although the reason why the deterioration of magnetic properties is suppressed is not clear, it is presumed as follows.

If the time from when the steel sheet reaches the predetermined heating temperature to when it is bitten in the first pass of the cold rolling is prolonged, the steel sheet temperature drops rapidly after it reaches the predetermined heating temperature. As a result, the biting temperature in the first pass of the cold rolling is lowered, rendering it difficult to obtain the effect of inhibiting dislocation movement due to the interaction between dislocations that are caused in the subsequent passes. When the time is within 5 seconds, the effect of inhibiting movement is sufficiently obtained.

We thus provide the following.

[1] A method of manufacturing a grain-oriented electrical steel sheet, comprising subjecting a steel slab to hot-rolling and optionally to annealing, then performing cold rolling once or twice or more with intermediate annealing performed therebetween to obtain a cold-rolled sheet with a final sheet thickness, and then subjecting the cold-rolled sheet with a final sheet thickness to decarburization annealing and then secondary recrystallization annealing, wherein
immediately before final cold rolling, a steel sheet is heated at a heating rate of 100° C./s or more to a heating temperature of 100° C. or higher and 350° C. or lower, and a time from when the steel sheet reaches the heating temperature to when it is bitten in a first pass of final cold rolling is set to within 5 seconds.

[2] The method of manufacturing a grain-oriented electrical steel sheet according to [1], wherein the steel slab comprises a chemical composition containing (consisting of), in mass %,
C: 0.01% or more and 0.10% or less,
Si: 2.0% or more and 4.5% or less,
Mn: 0.01% or more and 0.5% or less,
Al: 0.0100% or more and 0.0400% or less,
a total of at least one selected from S and Se: 0.0100% or more and 0.0500% or less, and
N: more than 0.0050% and 0.0120% or less, with the balance being Fe and inevitable impurities.

[3] The method of manufacturing a grain-oriented electrical steel sheet according to [1], wherein the steel slab comprises a chemical composition containing (consisting of), in mass %,
C: 0.01% or more and 0.10% or less,
Si: 2.0% or more and 4.5% or less,
Mn: 0.01% or more and 0.5% or less,
Al: less than 0.0100%,
S: 0.0070% or less,
Se: 0.0070% or less, and
N: 0.0050% or less,
with the balance being Fe and inevitable impurities.

[4] The method of manufacturing a grain-oriented electrical steel sheet according to [2] or [3], wherein the steel slab further contains, in mass %, at least one selected from the group consisting of
Sb: 0.005% or more and 0.50% or less,
Cu: 0.01% or more and 1.50% or less,
P: 0.005% or more and 0.50% or less,
Cr: 0.01% or more and 1.50% or less,
Ni: 0.005% or more and 1.50% or less,
Sn: 0.01% or more and 0.50% or less,
Nb: 0.0005% or more and 0.0100% or less,
Mo: 0.01% or more and 0.50% or less,
B: 0.001% or more and 0.007% or less, and
Bi: 0.0005% or more and 0.05% or less.

Advantageous Effect

According to the method of manufacturing a grain-oriented electrical steel sheet of the present disclosure, it is possible to stably manufacture a grain-oriented electrical steel sheet with excellent magnetic properties and little variation in iron loss in the longitudinal direction of a coil.

BRIEF DESCRIPTION OF THE DRAWINGS

In the accompanying drawings.

DETAILED DESCRIPTION

Figure 1:
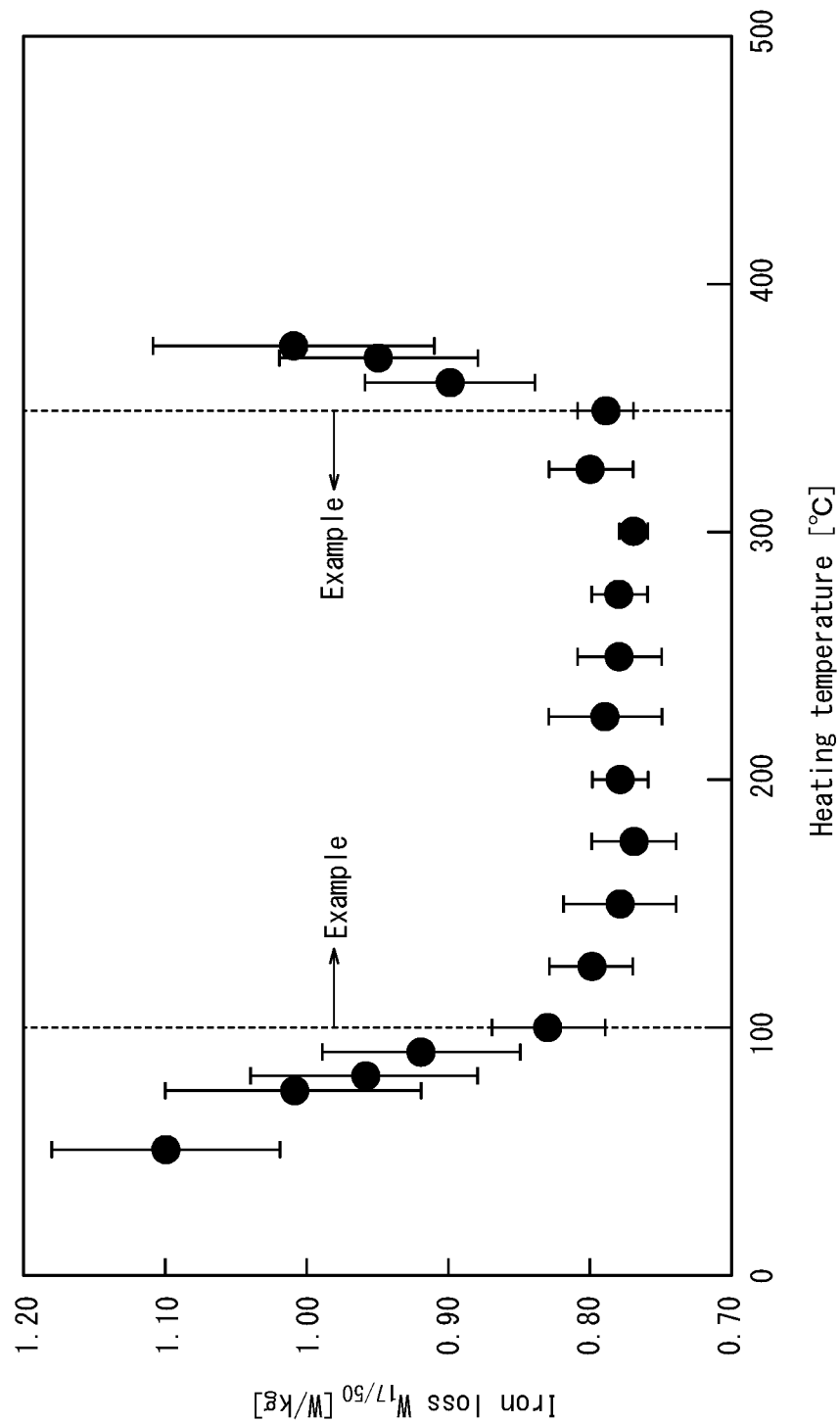
FIG. 1 illustrates the relationship between heating temperature (maximum temperature) and iron loss in Example 1.

The following describes the present disclosure in detail.
<Steel Slab>
A steel slab (steel material) used in the manufacturing method of the present disclosure can be manufactured with a known manufacturing method, such as steelmaking and continuous casting, and ingot casting and blooming. In steelmaking, molten steel obtained in a converter, an electric furnace, or the like can be subjected to secondary refining such as vacuum degassing to obtain a desired chemical composition.

The chemical composition of the steel slab may be a chemical composition for manufacturing a grain-oriented electrical steel sheet and may contain known components for a grain-oriented electrical steel sheet. It preferably contains C, Si, and Mn from the viewpoint of obtaining a grain-oriented electrical steel sheet with excellent magnetic properties. The C, Si and Mn contents may be as follows. As used herein, "%" of each component is a mass percentage unless otherwise specified.

C: 0.01% or More and 0.10% or Less

C is an element necessary for improving the texture of a hot-rolled steel sheet. When the C content is more than 0.10%, it is difficult to reduce, by decarburization annealing, the content to 0.0050% or less that causes no magnetic aging. On the other hand, when the C content is less than 0.01%, the microstructure is coarsened during slab heating, rendering recrystallization difficult in subsequent processes. Therefore, the C content is preferably 0.01% or more. The C content is preferably 0.10% or less. The C content is more preferably 0.01% or more. The C content is more preferably 0.08% or less.

Si: 2.0% or More and 4.5% or Less

Si is an element effective in increasing the electric resistance of steel and improving the iron loss properties. When the content is more than 4.5%, the workability is significantly deteriorated, rendering it difficult to manufacture by rolling. On the other hand, when the content is less than 2.0%, it is difficult to obtain sufficient iron loss reducing effects. Therefore, the Si content is preferably 2.0% or more. The Si content is preferably 4.5% or less.

Mn: 0.01% or More and 0.5% or Less

Mn is an element necessary for improving hot workability. When the content is more than 0.5%, the primary recrystallized texture is deteriorated, rendering it difficult to obtain secondary recrystallized grains highly accorded with the Goss orientation. On the other hand, when the content is less than 0.01%, it is difficult to obtain sufficient hot rolling workability. Therefore, the Mn content is preferably 0.01% or more. The Mn content is preferably 0.5% or less. The Mn content is more preferably 0.03% or more. The Mn content is more preferably 0.5% or less.

In addition to C, Si and Mn, the chemical composition may contain Al: 0.0100% or more and 0.0400% or less and N: more than 0.0050% and 0.012% or less as inhibitor components in secondary recrystallization. When the Al content and the N content are less than the lower limits, it is difficult to obtain predetermined effects of inhibitors. On the other hand, when the contents are more than the upper limits, precipitates disperse unevenly, which also renders it difficult to obtain predetermined effects of inhibitors.

In addition to Al and N, at least one selected from S and Se may be further contained as inhibitor components in a total amount of 0.0100% or more and 0.0500% or less. By containing either or both of S and Se, sulfides (such as MnS and $Cu_2S$) and selenides (such as MnSe and $Cu_2Se$) can be formed. Sulfides and selenides may be precipitated in combination. When the total amount of at least one selected from S and Se is less than the lower limit, it is difficult to obtain sufficient effects of inhibitors. When the total amount is more than the upper limits, precipitates disperse unevenly, and the effects of inhibitors cannot be sufficiently obtained.

The chemical composition may be adjusted so that it is suitable for an inhibitor-less system, by suppressing the Al content to less than 0.0100%. In this case, the N content may be 0.0050% or less, the S content may be 0.0070% or less, and the Se content may be 0.0070% or less.

In addition to the above elements, it is possible to contain at least one selected from the group consisting of Sb: 0.005% or more and 0.50% or less, Cu: 0.01% or more and 1.5% or less, P: 0.005% or more and 0.50% or less, Cr: 0.01% or more and 1.50% or less, Ni: 0.005% or more and 1.50% or less, Sn: 0.01% or more and 0.50% or less, Nb: 0.0005% or more and 0.0100% or less, Mo: 0.01% or more and 0.50% or less, B: 0.001% or more and 0.007% or less, and Bi: 0.0005% or more and 0.05% or less, to improve the magnetic properties. Sb, Cu, P, Cr, Ni, Sn, Nb, Mo, B, and Bi are elements that are useful for improving magnetic properties. When they are contained, their contents are preferably within the above ranges, from the viewpoint of sufficiently obtaining the magnetic property improving effect without inhibiting the development of secondary recrystallized grains.

The balance of the chemical composition of the steel slab is Fe and inevitable impurities.

<Manufacturing Process>

In the manufacturing method of the present disclosure, a steel slab is hot-rolled into a hot-rolled sheet. The steel slab may be heated before being subjected to hot rolling. The heating temperature in this case is preferably about 1050° C. or higher from the viewpoint of ensuring hot rolling manufacturability. The upper limit of the heating temperature is not particularly limited. However, temperatures above 1450° C. are close to the melting point of steel, rendering it difficult to keep the shape of the slab. Therefore, the temperature is preferably 1450° C. or lower.

Other hot rolling conditions are not particularly limited, and known conditions can be applied.

The obtained hot-rolled sheet may be subjected to hot-rolled sheet annealing. In this case, the annealing conditions are not particularly limited, and known conditions can be applied.

The hot-rolled sheet is optionally subjected to hot-rolled sheet annealing and then subjected to cold rolling to obtain a cold-rolled sheet. Before the cold rolling, the sheet may be descaled by acid cleaning or the like.

A cold-rolled sheet with a final thickness may be obtained by performing cold rolling once, or by performing cold rolling twice or more with intermediate annealing performed therebetween. The total rolling reduction of the cold rolling is not particularly limited, and it may be 70% or more and 95% or less. The rolling reduction of final cold rolling is not particularly limited, and it may be 60% or more and 95% or less. The final sheet thickness is not particularly limited, and it may be 0.1 mm or more and 1.0 mm or less.

Immediately before final cold rolling, the steel sheet is heated at a heating rate of 100° C./s or more to a heating temperature of 100° C. or higher and 350° C. or lower, and the time from when the steel sheet reaches the heating temperature to when it is bitten in the first pass of final cold rolling is set to within 5 seconds.

The heating rate is set to 100° C./s or more. Because the diffusion rate of carbon in steel increases rapidly at high temperatures of 100° C. or higher, holding a steel sheet at that temperature for a long time causes rapid coarsening of carbides and a significant decrease in the amount of solute carbon and the number of fine carbides in the steel. As a result, the effect of pinning dislocations by carbides is reduced beyond the effect of increasing the biting temperature, leading to deterioration of the texture. Therefore, the heating rate is set to 100° C./s or more so that the predetermined heating temperature can be reached in a short period of time. The heating rate is preferably 150° C./s or more. Since the time required for heating is preferably as short as possible, the upper limit of the heating rate is not particularly limited, and it may be, for example, 300° C./s or less.

The heating temperature (maximum temperature) for heating is set to 100° C. or higher and 350° C. or lower. If the temperature is lower than 100° C., the effect of increasing the biting temperature in the first pass cannot be fully realized. If the temperature is higher than 350° C., the shape of the sheet deteriorates due to poor lubrication during rolling. The heating temperature is preferably 120° C. or higher. The heating temperature is preferably 300° C. or lower.

The time from when the steel sheet reaches the predetermined heating temperature to when it is bitten in the first pass of final cold rolling to set to within 5 seconds. If the time is longer than 5 seconds, the steel sheet temperature drops, and the effect of increasing the biting temperature in the first pass is not fully realized. After reaching the predetermined heating temperature, it is preferable to maintain the temperature as long as possible until the steel sheet is bitten in the first pass.

The heating method is not particularly limited, and examples thereof include air bath, oil bath, sand bath, and induction heating. Induction heating is preferred because it does not require large-scale equipment, has little influence on the appearance of the steel sheet after rolling, and allows heating in a short period of time. When induction heating is used, the predetermined heating temperature may be the steel sheet temperature on the delivery side of an induction heating device.

A rolling mill used for the cold rolling is not particularly limited, and examples thereof include a reverse rolling mill and a tandem mill. A tandem mill in which an induction heating device is installed on the entry side is particularly preferred because rolling can be performed immediately after heating. An induction heating device for steel sheet heating and soaking may be installed on the entry side of the tandem mill.

Heat treatment such as aging treatment or warm rolling may be interposed between cold rolling.

In the method of manufacturing a grain-oriented electrical steel sheet of the present disclosure, a cold-rolled sheet with a final sheet thickness may be subjected to decarburization annealing and then secondary recrystallization annealing to obtain a grain-oriented electrical steel sheet. After secondary recrystallization annealing, an insulating coating may be applied on the steel sheet.

The conditions of the decarburization annealing are not particularly limited. In general, decarburization annealing often serves as primary recrystallization annealing, and decarburization annealing can also serve as primary recrystallization annealing in the manufacturing method of the present disclosure. In such a case, the conditions are particularly not limited, and known conditions can be applied. For example, the annealing may be performed at 800° C. for 2 minutes in a hot hydrogen atmosphere.

After subjecting the cold-rolled sheet to decarburization annealing, final annealing is performed for secondary recrystallization. Before the final annealing, an annealing separator may be applied to the surface of the steel sheet. The annealing separator is not particularly limited, and known ones can be used. Examples thereof include an annealing separator mainly composed of MgO in which $TiO_2$ or the like is added if necessary, and an annealing separator mainly composed of $SiO_2$ or $Al_2O_3$.

After the final annealing, it is preferable to coat the surface of the steel sheet with an insulating coating, bake the steel sheet, and if necessary, perform flattening annealing to adjust the shape of the steel sheet. The type of the insulating coating is not particularly limited. In a case of forming an insulating coating that imparts tensile strength to the surface of the steel sheet, it is preferable to use a coating solution containing phosphate-colloidal silica, such as those described in JP S50-79442 A, JP S48-39338 A and JP S56-75579 A, and bake the steel sheet at about 800° C.

EXAMPLES

Example 1

A steel slab having a composition containing, in mass %, C: 0.037%, Si: 3.4%, and Mn: 0.05%, and containing, in mass ppm, 31 ppm of S, 31 ppm of Se, 50 ppm of N, and 85 ppm of sol. Al, with the balance being Fe and inevitable impurities, was heated to 1210° C. and then subjected to hot rolling to obtain a hot-rolled sheet with a thickness of 2.0 mm.

The hot-rolled sheet was subjected to hot-rolled sheet annealing at 1000° C. for 60 seconds, then cooled from 800° C. to 300° C. at a rate of 20° C./s, and then wound into a coil. The obtained sheet after hot-rolled sheet annealing was tandem-rolled once using a tandem mill (roller diameter: 300 mm, number of stands: 5) to obtain a cold-rolled sheet with a thickness of 0.20 mm. At that time, the steel sheet was heated to a predetermined heating temperature (maximum temperature) at a heating rate of 100° C./s by an induction heating device for steel sheet heating and soaking installed immediately before a rolling stand of the first pass, and the steel sheet was bitten in the rolling stand of the first pass 3 seconds after it reached the heating temperature. The heating temperature is the temperature of the steel sheet on the delivery side of the induction heating device.

The cold-rolled sheet was subjected to primary recrystallization annealing that also served as decarburization annealing at a soaking temperature of 840° C. for a soaking time of 100 seconds. Next, an annealing separator mainly composed of MgO was applied to the surface of the steel sheet. Next, the steel sheet was subjected to final annealing for secondary recrystallization.

A coating solution containing phosphate-chromate-colloidal silica in a weight ratio of 3:1:2 was applied to the surface of the steel sheet after the secondary recrystallization annealing, and flattening annealing was performed at 800° C. for 30 seconds to obtain a product coil.

The iron loss of the product coil was measured at three points in the longitudinal direction of the coil, and the average value and the standard deviation were determined. In the example, the iron loss was measured by cutting samples from positions 200 m, 2500 m, and 4800 m, respectively, from the longitudinal end of the coil with a total length of about 5000 m so that the total weight was 500 g or more, and conducting an Epstein test.

The heating temperature (maximum temperature) was changed in a range of 50° C. or higher to 450° C., and the relationship between heating temperature (maximum temperature) and iron loss is illustrated in FIG. 1.

As illustrated in FIG. 1, when the heating temperature (maximum temperature) by induction heating is in a range of 100° C. or higher and 350° C. or lower, the magnetic properties are good, and the variations are small. On the other hand, when the heating temperatures is 375° C. or higher, the steel sheet has a poor shape and fracture.

Example 2

The sheet after hot-rolled sheet annealing prepared in Example 1 was heated to a heating temperature (maximum temperature) of 100° C. at a heating rate of 100° C./s using the induction heating device and the tandem mill used in Example 1, and cold rolling was performed by changing the time from when the sheet reached the heating temperature to when it was bitten in a rolling stand of the first pass (elapsed time after heating) in a range of 1 second to 10 seconds to obtain a cold-rolled sheet with a thickness of 0.20 mm. The obtained cold-rolled sheet was used to produce a product coil in the same manner as in Example 1. The iron loss of the product coil was measured at three points in the longitudinal direction of the coil, and the average value and the standard deviation were determined in the same manner as in Example 1. The relationship between elapsed time after heating and iron loss is illustrated in FIG. 2.

Figure 2:
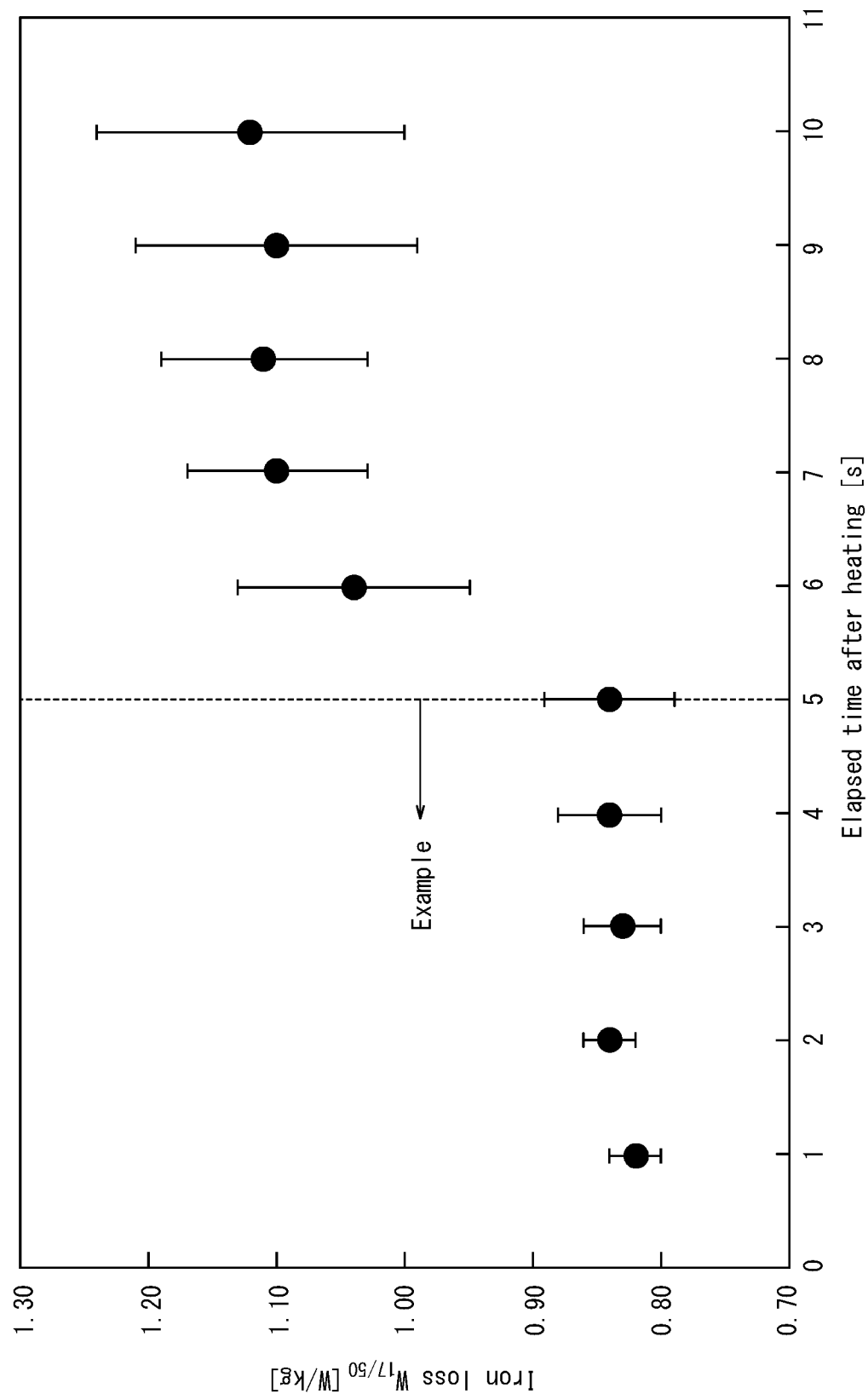
FIG. 2 illustrates the relationship between elapsed time after heating and iron loss in Example 2.

As illustrated in FIG. 2, when the elapsed time after heating was within 5 seconds, there was little variation in the magnetic properties and the magnetic properties were good, and when the elapsed time after heating exceeded that time, deterioration in iron loss properties and increased variations were observed.

Example 3

The sheet after hot-rolled sheet annealing prepared in Example 1 was heated to a heating temperature (maximum temperature) of 100° C. using the induction heating device and the tandem mill used in Example 1 where the heating rate was changed in a range of 10° C./s to 200° C./s, and cold rolling was performed where the sheet was bitten in a rolling stand of the first pass 3 seconds after reaching the heating temperature to obtain a cold-rolled sheet with a thickness of 0.20 mm. The obtained cold-rolled sheet was used to produce a product coil in the same manner as in Example 1. The iron loss of the product coil was measured at three points in the longitudinal direction of the coil, and the average value and the standard deviation were determined in the same manner as in Example 1. The relationship between heating rate and iron loss is illustrated in FIG. 3.

Figure 3:
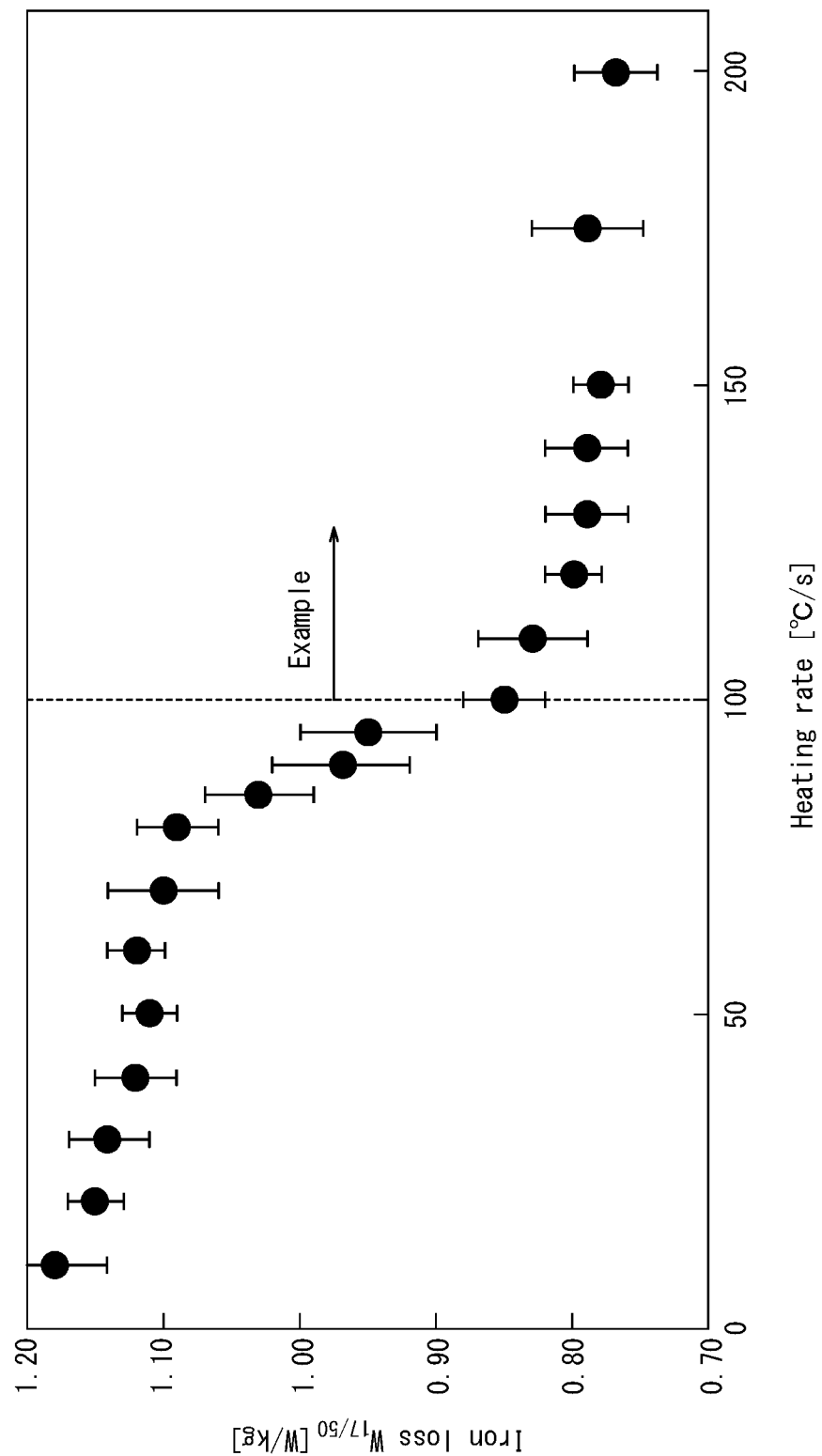
FIG. 3 illustrates the relationship between heating rate and iron loss in Example 3.

As illustrated in FIG. 3, when the heating rate was 100° C./s or more, the iron loss was 0.90 W/kg or less, which was good.

Example 4

A steel slab having a composition containing, in mass %, C: 0.06%, Si: 3.4% and Mn: 0.06%, and containing 90 ppm of N, 250 ppm of sol. Al, 0.02% of S, and 0.02% of Se, with the balance being Fe and inevitable impurities, was heated to 1400° C. and then subjected to hot rolling to obtain a hot-rolled sheet with a thickness of 2.0 mm.

The hot-rolled sheet was subjected to hot-rolled sheet annealing at 1000° C. for 60 seconds, then cooled from 800° C. to 300° C. at a rate of 20° C./s, and then wound into a coil. The obtained sheet after hot-rolled sheet annealing was subjected to cold rolling for the first time by a tandem mill (roller diameter: 300 mm, number of stands: 5) and then to intermediate annealing at 1100° C. for 80 seconds in an atmosphere of 75 vol % $N_2$+25 vol % $H_2$ with a dew point of 46° C., and then the sheet was subjected to final cold rolling by a tandem mill (roller diameter: 300 mm, number of stands: 5) to obtain a cold-rolled sheet with a thickness of 0.20 mm. During the final cold rolling, induction heating was performed by an induction heating device for steel sheet heating and soaking installed immediately before a rolling stand of the first pass. The heating temperature (maximum temperature) during induction heating, the heating rate, and the time from when the sheet reached the heating temperature to when it was bitten in the rolling stand of the first pass (elapsed time after heating) were varied as listed in Table 1.

The cold-rolled sheet was subjected to primary recrystallization annealing that also served as decarburization annealing at a soaking temperature of 840° C. for a soaking time of 100 seconds. Next, an annealing separator mainly composed of MgO was applied to the surface of the steel sheet. Next, the steel sheet was subjected to final annealing for secondary recrystallization.

A coating solution containing phosphate-chromate-colloidal silica in a weight ratio of 3:1:2 was applied to the surface of the steel sheet after the secondary recrystallization annealing, and flattening annealing was performed at 800° C. for 30 seconds to obtain a product coil.

The iron loss of the product coil was measured at three points in the longitudinal direction of the coil, and the average value and the standard deviation were determined in the same manner as in Example 1. The results are listed in Table 1.

TABLE 1

| No. | Heating rate (° C./s) | Maximum temperature (° C.) | Elapsed time after heating (s) | Iron loss $W_{17/50}$ (W/kg) | Standard deviation | Remarks |
| --- | --- | --- | --- | --- | --- | --- |
| 1 | 10 | 100 | 3 | 1.12 | 0.04 | Comparative Example |
| 2 | 20 | 100 | 3 | 1.11 | 0.02 | Comparative Example |
| 3 | 30 | 100 | 3 | 1.13 | 0.04 | Comparative Example |
| 4 | 40 | 100 | 3 | 1.12 | 0.03 | Comparative Example |
| 5 | 50 | 100 | 3 | 1.10 | 0.03 | Comparative Example |
| 6 | 60 | 100 | 3 | 1.09 | 0.02 | Comparative Example |
| 7 | 70 | 100 | 3 | 0.99 | 0.02 | Comparative Example |
| 8 | 80 | 100 | 3 | 0.98 | 0.04 | Comparative Example |
| 9 | 85 | 100 | 3 | 0.98 | 0.05 | Comparative Example |
| 10 | 90 | 100 | 3 | 0.96 | 0.03 | Comparative Example |
| 11 | 95 | 100 | 3 | 0.95 | 0.03 | Comparative Example |
| 12 | 100 | 100 | 3 | 0.85 | 0.05 | Example |
| 13 | 110 | 100 | 3 | 0.84 | 0.03 | Example |
| 14 | 120 | 100 | 3 | 0.83 | 0.04 | Example |
| 15 | 130 | 100 | 3 | 0.82 | 0.02 | Example |
| 16 | 140 | 100 | 3 | 0.83 | 0.03 | Example |
| 17 | 150 | 100 | 3 | 0.83 | 0.03 | Example |

TABLE 1-continued

| No. | Heating rate (° C./s) | Maximum temperature (° C.) | Elapsed time after heating (s) | Iron loss $W_{17/50}$ (W/kg) | Standard deviation | Remarks |
|---|---|---|---|---|---|---|
| 18 | 175 | 100 | 3 | 0.84 | 0.02 | Example |
| 19 | 200 | 100 | 3 | 0.80 | 0.04 | Example |
| 20 | 100 | 50 | 3 | 1.08 | 0.08 | Comparative Example |
| 21 | 100 | 75 | 3 | 0.98 | 0.09 | Comparative Example |
| 22 | 100 | 80 | 3 | 0.95 | 0.08 | Comparative Example |
| 23 | 100 | 90 | 3 | 0.92 | 0.07 | Comparative Example |
| 24 | 100 | 125 | 3 | 0.86 | 0.02 | Example |
| 25 | 100 | 150 | 3 | 0.84 | 0.03 | Example |
| 26 | 100 | 175 | 3 | 0.86 | 0.04 | Example |
| 27 | 100 | 200 | 3 | 0.83 | 0.01 | Example |
| 28 | 100 | 225 | 3 | 0.82 | 0.02 | Example |
| 29 | 100 | 250 | 3 | 0.81 | 0.03 | Example |
| 30 | 100 | 275 | 3 | 0.80 | 0.04 | Example |
| 31 | 100 | 300 | 3 | 0.78 | 0.02 | Example |
| 32 | 100 | 325 | 3 | 0.81 | 0.01 | Example |
| 33 | 100 | 350 | 3 | 0.82 | 0.03 | Example |
| 34 | 100 | 360 | 3 | 0.91 | 0.05 | Example |
| 35 | 100 | 370 | 3 | 0.94 | 0.06 | Example |
| 36 | 100 | 375 | 3 | 0.98 | 0.12 | Comparative Example |
| 37 | 100 | 100 | 1 | 0.77 | 0.01 | Example |
| 38 | 100 | 100 | 2 | 0.80 | 0.02 | Example |
| 39 | 100 | 100 | 4 | 0.81 | 0.03 | Example |
| 40 | 100 | 100 | 5 | 0.85 | 0.04 | Example |
| 41 | 100 | 100 | 6 | 0.95 | 0.08 | Comparative Example |
| 42 | 100 | 100 | 7 | 0.99 | 0.09 | Comparative Example |
| 43 | 100 | 100 | 8 | 1.02 | 0.10 | Comparative Example |
| 44 | 100 | 100 | 2 | 1.03 | 0.09 | Comparative Example |
| 45 | 100 | 100 | 10 | 1.10 | 0.11 | Comparative Example |
| 46 | 10 | 50 | 3 | 1.15 | 0.11 | Comparative Example |
| 47 | 10 | 100 | 10 | 1.16 | 0.10 | Comparative Example |
| 48 | 120 | 50 | 10 | 1.18 | 0.12 | Comparative Example |
| 49 | 10 | 50 | 10 | 1.20 | 0.13 | Comparative Example |

As indicated in Table 1, even when a steel slab that had been added with a large amount of inhibitor was used and intermediate annealing was interposed in the cold rolling process as in Example 4, the magnetic properties were good and the variations in the properties in the longitudinal direction of the coil were reduced if a predetermined heat treatment was performed in final cold rolling.

Example 5

Steel having a composition containing, in mass %, C: 0.036%, Si: 3.4% and Mn: 0.06%, and containing, in mass ppm, 50 ppm of N, 72 ppm of sol. Al, 31 ppm of S, and 31 ppm of Se, and containing Sb, Cu, P, Cr, Ni, Sn, Nb, Mo, B, and Bi as other components as listed in Table 2, with the balance being Fe and inevitable impurities, was prepared by steelmaking to obtain a steel slab, and the steel slab was heated to 1210° C. and then subjected to hot rolling to obtain a hot-rolled sheet with a thickness of 2.0 mm.

The hot-rolled sheet was subjected to hot-rolled sheet annealing at 1000° C. for 60 seconds, then cooled from 800° C. to 300° C. at a rate of 20° C./s, and then wound into a coil. The obtained sheet after hot-rolled sheet annealing was tandem-rolled once using a tandem mill (roller diameter: 300 mm, number of stands: 5) to obtain a cold-rolled sheet with a thickness of 0.20 mm. At that time, the steel sheet was heated to 100° C. at a heating rate of 100° C./s by an induction heating device for steel sheet heating and soaking installed immediately before a rolling stand of the first pass, and the steel sheet was bitten in the stand of the first pass 3 seconds after it reached 100° C.

The cold-rolled sheet was subjected to primary recrystallization annealing that also served as decarburization annealing at a soaking temperature of 840° C. for a soaking time of 100 seconds. Next, an annealing separator mainly composed of MgO was applied to the surface of the steel sheet. Next, the steel sheet was subjected to final annealing for secondary recrystallization.

A coating solution containing phosphate-chromate-colloidal silica in a weight ratio of 3:1:2 was applied to the surface of the steel sheet after the secondary recrystallization annealing, and flattening annealing was performed at 800° C. for 30 seconds to obtain a product coil. The iron loss of the product coil was measured at three points in the longitudinal direction of the coil, and the average value and the standard deviation were determined in the same manner as in Example 1. The results are listed in Table 2.

TABLE 2

| Steel sample ID | Other components added (mass %) | | | | | | | | | | Iron loss $W_{17/50}$ (W/kg) | Standard deviation |
|---|---|---|---|---|---|---|---|---|---|---|---|---|
| | Sb | Cu | P | Cr | Ni | Sn | Nb | Mo | B | Bi | | |
| A1 | — | — | — | — | — | — | — | — | — | — | 0.850 | 0.04 |
| A2 | 0.01 | 0.05 | 0.05 | — | — | — | — | — | — | — | 0.780 | 0.03 |

TABLE 2-continued

| Steel sample ID | Other components added (mass %) | | | | | | | | | | Iron loss $W_{17/50}$ (W/kg) | Standard deviation |
| --- | --- | --- | --- | --- | --- | --- | --- | --- | --- | --- | --- | --- |
| | Sb | Cu | P | Cr | Ni | Sn | Nb | Mo | B | Bi | | |
| A3 | 0.01 | — | — | — | 0.05 | — | 0.005 | — | — | — | 0.775 | 0.04 |
| A4 | — | 0.05 | 0.05 | 0.02 | — | — | — | — | — | — | 0.770 | 0.03 |
| A5 | — | — | — | — | 0.05 | 0.02 | 0.005 | — | — | — | 0.790 | 0.04 |
| A6 | — | — | — | — | — | — | — | 0.02 | 0.002 | 0.01 | 0.780 | 0.04 |
| A7 | — | 0.05 | 0.05 | — | 0.05 | — | — | — | — | — | 0.780 | 0.03 |
| A8 | — | — | — | — | — | 0.02 | 0.005 | — | — | 0.01 | 0.790 | 0.03 |
| A9 | — | — | — | 0.02 | — | — | — | 0.02 | 0.002 | — | 0.790 | 0.02 |
| A10 | — | 0.05 | — | — | — | 0.02 | — | — | — | 0.01 | 0.780 | 0.03 |
| A11 | — | — | — | 0.02 | — | 0.02 | — | 0.02 | — | — | 0.770 | 0.01 |
| A12 | — | — | 0.05 | — | — | — | — | — | — | — | 0.790 | 0.04 |
| A13 | — | — | — | — | 0.05 | — | — | — | — | — | 0.790 | 0.04 |
| A14 | — | — | — | — | — | — | — | — | 0.002 | — | 0.780 | 0.04 |

As indicated in Table 2, steel sheets to which at least one of Sb, Cu, P, Cr, Ni, Sn, Nb, Mo, B, and Bi had been added had an iron loss of 0.80 W/kg or less. In particular, the iron loss was reduced, and the variations in the properties in the longitudinal direction of a coil were small for these steel sheets.

The invention claimed is:

1. A method of manufacturing a grain-oriented electrical steel sheet, comprising subjecting a steel slab to hot-rolling and optionally to annealing, then performing cold rolling once or twice or more with intermediate annealing performed therebetween to obtain a cold-rolled sheet with a final sheet thickness, and then subjecting the cold-rolled sheet with a final sheet thickness to decarburization annealing and then secondary recrystallization annealing, wherein
   immediately before final cold rolling, a steel sheet is heated at a heating rate of 100° C./s or more to a heating temperature of 100° C. or higher and 350° C. or lower, and a time from when the steel sheet reaches the heating temperature to when it is bitten in a first pass of final cold rolling is set to within 5 seconds.

2. The method of manufacturing a grain-oriented electrical steel sheet according to claim 1, wherein the steel slab comprises a chemical composition containing, in mass %,
   C: 0.01% or more and 0.10% or less,
   Si: 2.0% or more and 4.5% or less,
   Mn: 0.01% or more and 0.5% or less,
   Al: 0.0100% or more and 0.0400% or less,
   a total of at least one selected from S and Se: 0.0100% or more and 0.0500% or less, and
   N: more than 0.0050% and 0.0120% or less,
   with the balance being Fe and inevitable impurities.

3. The method of manufacturing a grain-oriented electrical steel sheet according to claim 1, wherein the steel slab comprises a chemical composition containing, in mass %,
   C: 0.01% or more and 0.10% or less,
   Si: 2.0% or more and 4.5% or less,
   Mn: 0.01% or more and 0.5% or less,
   Al: less than 0.0100%,
   S: 0.0070% or less,
   Se: 0.0070% or less, and
   N: 0.0050% or less,
   with the balance being Fe and inevitable impurities.

4. The method of manufacturing a grain-oriented electrical steel sheet according to claim 2, wherein the steel slab further contains, in mass %, at least one selected from the group consisting of
   Sb: 0.005% or more and 0.50% or less,
   Cu: 0.01% or more and 1.50% or less,
   P: 0.005% or more and 0.50% or less,
   Cr: 0.01% or more and 1.50% or less,
   Ni: 0.005% or more and 1.50% or less,
   Sn: 0.01% or more and 0.50% or less,
   Nb: 0.0005% or more and 0.0100% or less,
   Mo: 0.01% or more and 0.50% or less,
   B: 0.001% or more and 0.007% or less, and
   Bi: 0.0005% or more and 0.05% or less.

5. The method of manufacturing a grain-oriented electrical steel sheet according to claim 3, wherein the steel slab further contains, in mass %, at least one selected from the group consisting of
   Sb: 0.005% or more and 0.50% or less,
   Cu: 0.01% or more and 1.50% or less,
   P: 0.005% or more and 0.50% or less,
   Cr: 0.01% or more and 1.50% or less,
   Ni: 0.005% or more and 1.50% or less,
   Sn: 0.01% or more and 0.50% or less,
   Nb: 0.0005% or more and 0.0100% or less,
   Mo: 0.01% or more and 0.50% or less,
   B: 0.001% or more and 0.007% or less, and
   Bi: 0.0005% or more and 0.05% or less.

6. The method of manufacturing a grain-oriented electrical steel sheet according to claim 1, wherein the final cold rolling is performed by a tandem mill, and the steel is heated by an induction heating device installed on an entry side of the tandem mill.

* * * * *